Nov. 26, 1940.  M. J. SCHAA  2,222,916
MEANS FOR GUIDING TRACTORS
Filed Oct. 23, 1939  3 Sheets-Sheet 3
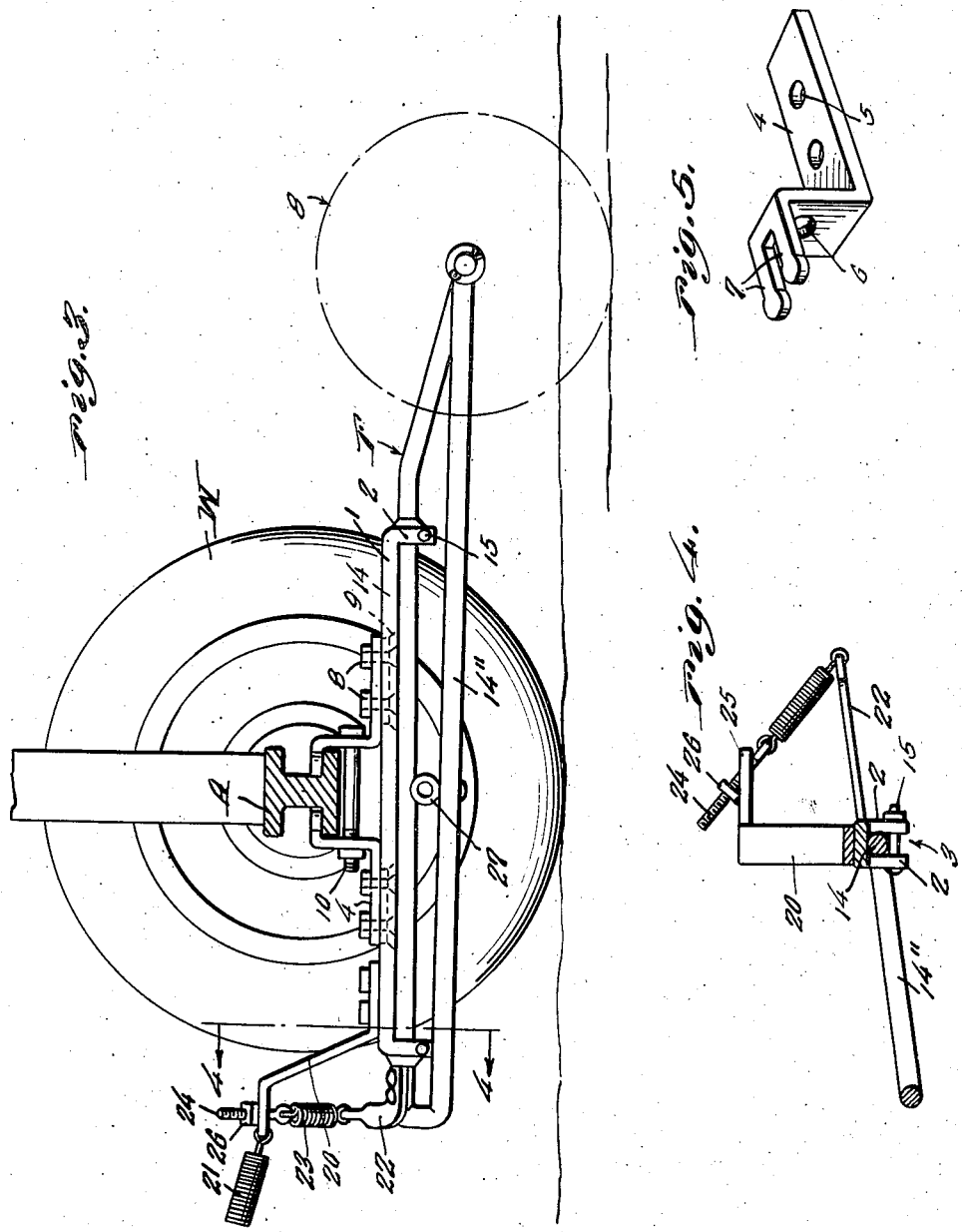
Inventor
M. J. Schaa
By Clarence A. O'Brien
and Hyman Berman
Attorneys Patented Nov. 26, 1940

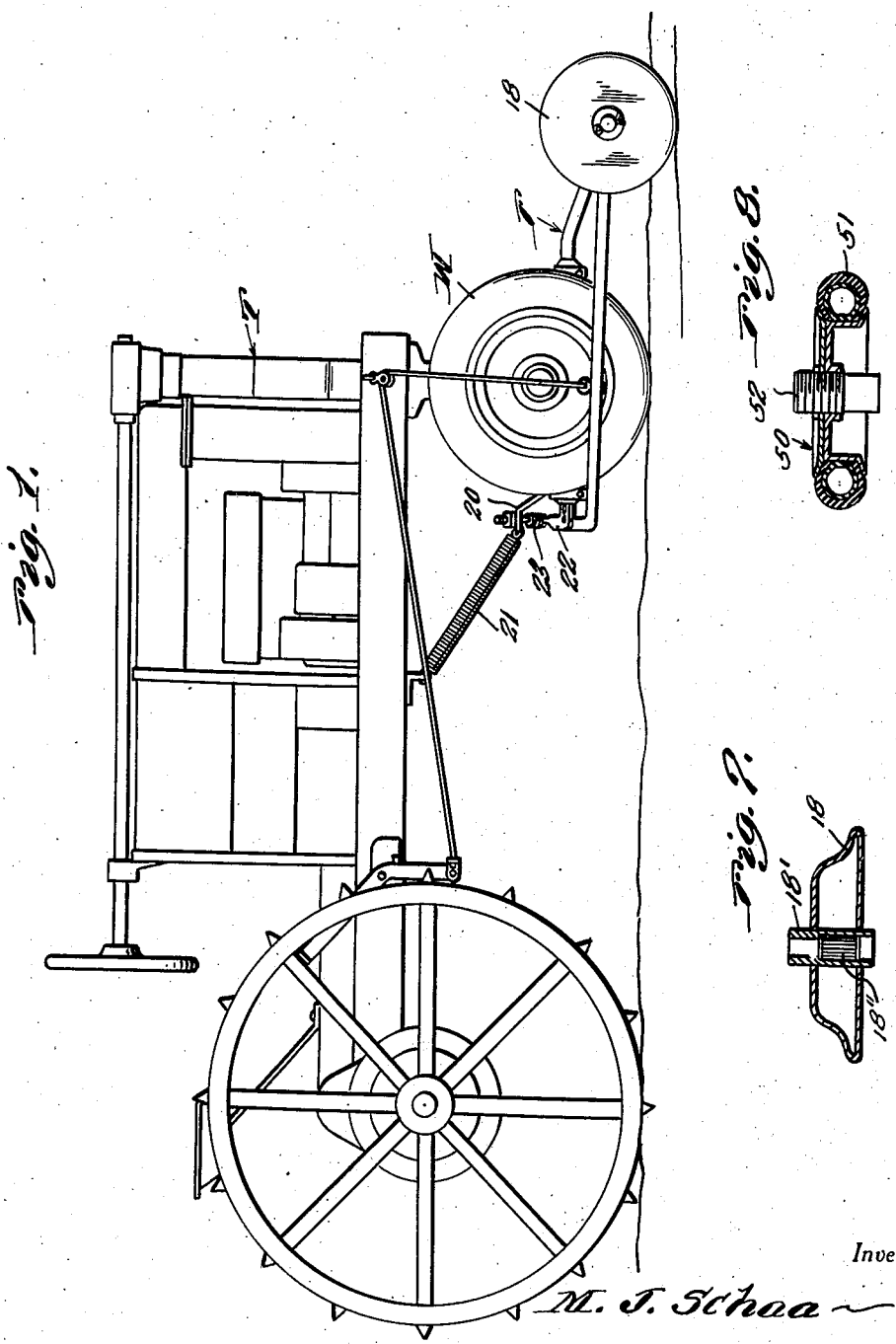

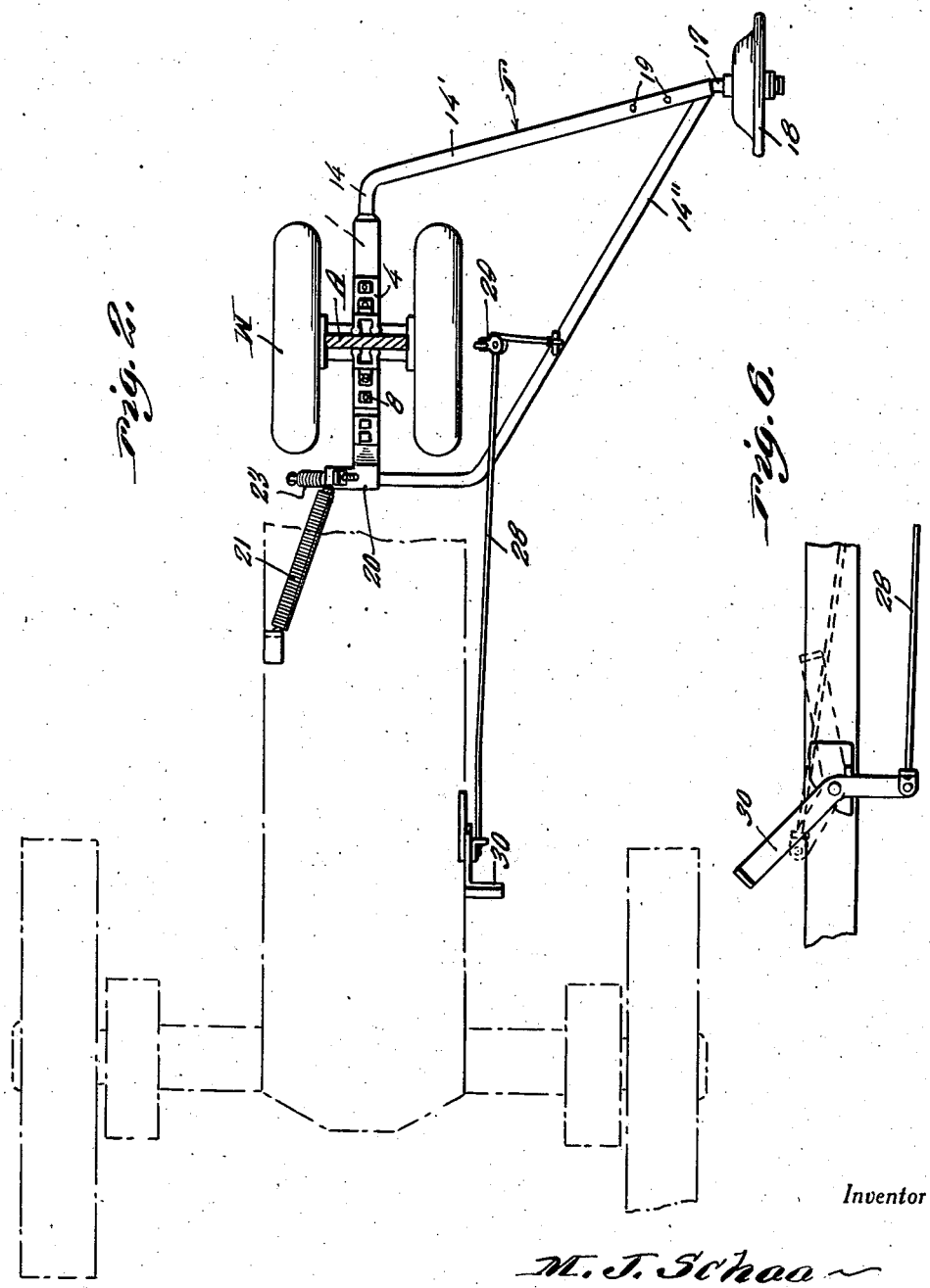

2,222,916

UNITED STATES PATENT OFFICE 2,222,916

MEANS FOR GUIDING TRACTORS

Marvin J. Schaa, Ashton, Iowa

Application October 23, 1939, Serial No. 300,875

3 Claims. (Cl. 97—49)

This invention relates to means for guiding tractors while pulling plows or having plows attached thereto, the general object of the invention being to provide means connected with the front steering mechanism of the tractor and including a wheel for running in a furrow for guiding the tractor as it moves across the field so that the furrows being made by the plow will parallel those previously made.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is an elevation of a tractor showing the invention in use thereon.

Figure 2 is a diagrammatic plan view of Figure 1.

Figure 3 is a vertical sectional view through the front axle and showing the parts of the invention in elevation.

Figure 4 is a section on the line 4—4 of Figure 3.

Figure 5 is a view of one of the clamping members.

Figure 6 is a view of the pedal for operating the raising cable.

Figures 7 and 8 are sectional views through different kinds of wheels which may be used with the invention.

In these drawings the letter A indicates the front axle of a tractor T, the axle having the wheels W at its ends and it being understood that this assembly of axle and two wheels forms the steering means for the tractor. In carrying out my invention I provide an elongated bar 1 with its ends turned down as shown at 2, the said ends having openings therein as shown at 3 in Figure 4. This bar is clamped to the axle A by a pair of clamping members 4 each of which includes a body part having holes 5 therein, an upstanding part having a hole 6 therein and a pair of outwardly extending parts 7 having rounded ends as shown in Figure 5. Bolts 8 pass through the holes 5 in each member 4 into slots 9 in the bar 1 so that the members 4 can be moved toward and away from each other when the bolts 8 are loosened. A long bolt 10 passes through the holes 6 and the members 7 clamp over the under flange of the axle A with the rounded ends fitting in openings formed in the axle A so that by tightening the nut of the bolt 10 and the nuts of the bolts 8 the bar 1 is firmly attached to the axle A and extends at right angles thereto, as shown in Figure 2. A bar is bent to form a substantially triangular-shaped frame F which has a straight part 14 which passes under the bar 1 and through the holes 3 in the turn-down ends 2 of the bar 1 and it is held in these turned down ends by the bolts 15 but in a manner that it can turn. The frame F also includes the outwardly and forwardly extending part 14' and the brace part 14" which extends from the outer end of the part 14' to the rear end of the part 14. This part 14', at least, is tubular to receive the shaft 17 to the outer end of which the wheel 18 is rotatably connected. This shaft 17 can be pulled more or less out of the tubular part 14' to adjust the position of the wheel 18 with respect to the outer end of the frame F and the shaft 17 is held in adjusted position by the clamps 19. Also, the outer end of the shaft 17 is slightly bent as shown in Figure 2 and by loosening the clamps 19 the shaft can be partly turned which changes the angle of the wheel 18 so as to cause the wheel to have more or less pressure against the furrow wall.

A bracket 20 extends upwardly from the rear end of the bar 1 and a spring 21 is attached to the bracket and to a part of the under portion of the tractor. This spring helps to cause the attachment to steer the tractor to left if pulling a right hand plow or a plow that throws the dirt to the right and it also acts to steer the tractor to the right if the tractor is pulling a left hand plow or a plow that throws the dirt to the left. The rear end of the spring is connected to an eye bolt suitably connected to the tractor and having threads therein so that the tension of the spring can be regulated. A bracket 22 is connected to the rear end of the part 14 of the frame F and a spring 23 has one end connected with this bracket 22 and its other end is connected to a bolt 24 which passes through a hole in a part 25 attached to the upper end of bracket 20, the bolt having a nut 26 thereon for adjusting the tension of the spring. This spring causes the wheel 18 to engage the ground with a certain amount of pressure which can be regulated by adjusting the nut 26 and this spring is useful where the frame F is of light construction as it preferably is as I prefer to make the frame of tubular stock.

An eye bolt 27 is connected with the intermediate part of the portion 14" of the frame F and a cable 28 has one end connected with the eye bolt the cable passing over a guide pulley 29 attached to a part of the tractor and to a pedal or lever 30 pivoted to a part of the tractor adjacent the driver's seat, this lever or pedal 30 being so formed that in one position it will slack the cable so that the frame F can lower itself to place the wheel 18 in the furrow but by moving the lever 30 to the dotted line position shown in Figure 6 the lever part is moved beyond dead-center and cause the cable to hold the frame F in raised position with the wheel 18 out of the furrow. This is desirable when the tractor is making turns at the ends of the field where it is not desired to use the attachment.

Various kinds of wheels can be used with the device, Figure 7 showing a hollow wheel 18 which is similar to the wheel shown in Figure 2 with a hub 18' having ball bearings 18" therein for receiving the spindle formed at the outer end of the shaft 17. Figure 8 shows a wheel 50 formed to receive a pneumatic tire 51 and provided with a hub 52 having ball bearings therein.

With this device attached to a tractor the tractor will be practically self steering in a plowed field with the wheel 18 following the furrow previously made.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention what is claimed as new is:

1. Steering means for a tractor comprising a frame, said frame including a straight part extending longitudinally of the tractor, means for connecting said straight part to the front steering axle of the tractor for rotary movement, a part of the frame extending outwardly and forwardly, a furrow engaging wheel at the outer end of said frame, a spindle for said wheel having a part bent at a slight angle from the wheel carrying part, means for adjustably supporting the said bent part in the outer end of said frame, spring means connecting a part of the frame holding means to the tractor and means for raising and lowering the wheel carrying part of the frame.

2. In a tractor including a front steering axle, a bar, means for clamping the bar to the axle, a substantially triangular-shaped frame having one part rotatably held in the bar with other parts extending outwardly and forwardly from the front of the tractor, a furrow wheel at the outer end of said other parts, spring means for connecting the rear end of the bar to the tractor, adjustable spring means for exerting pressure on the frame to cause the furrow wheel to move downwardly and manually operated means for raising and lowering the frame to raise and lower the furrow wheel.

3. In combination with a tractor having a front steering axle, a longitudinally extending bar, clamping members connected with the bar and engaging the axle for holding the bar to the axle, said bar having its ends turned downwardly and provided with openings, a frame including a straight inner part passing through such openings for rotary movement therein and said frame also including converging outer parts which extend forwardly and outwardly of the front of the tractor, a shaft adjustably carried by said outer parts, a furrow wheel carried by the shaft, spring means connecting the rear of the bar to a part of the tractor and means connected with the outer part of the frame for raising and lowering the frame to raise and lower the furrow wheel.

MARVIN J. SCHAA.